United States Patent [19]
Maginot et al.

[11] Patent Number: 5,682,929
[45] Date of Patent: Nov. 4, 1997

[54] METHOD FOR THE FILLING AND EMPTYING OF A RECEPTACLE

[75] Inventors: Helmut Maginot, Burgkirchen; Franz Stadler, Neuötting; Peter Pfaffinger, Haiming; Henry Hackbarth, Burgkirchen; Johann Lindhuber, Mehring, all of Germany

[73] Assignee: Wacker-Chemie GmbH, Munich, Germany

[21] Appl. No.: 646,800

[22] Filed: May 21, 1996

[30] Foreign Application Priority Data

Jul. 21, 1995 [DE] Germany .................. 195 26 743.5

[51] Int. Cl.⁶ .................................................. B65B 1/04
[52] U.S. Cl. ........................ 141/65; 141/10; 141/65; 141/83; 141/114; 141/313; 53/512; 222/105; 222/152
[58] Field of Search ................... 141/10, 65, 68, 141/83, 114, 313, 314, 315, 317; 222/152, 105, 181.2, 181.3; 53/434, 512, 492, 384.1; 414/291, 403, 411; 15/304, 352, 246.3, DIG. 8

[56] References Cited

U.S. PATENT DOCUMENTS

| 2,815,621 | 12/1957 | Carter ........................... 53/512 |
| 2,831,510 | 4/1958 | Carter . |
| 3,710,979 | 1/1973 | Klebe et al. ..................... 222/1 |
| 4,640,082 | 2/1987 | Gill . |
| 4,913,321 | 4/1990 | Abboud ........................ 222/105 |
| 5,402,918 | 4/1995 | Nishiyama et al. ............. 222/152 |

FOREIGN PATENT DOCUMENTS

| 0033832 | 8/1981 | European Pat. Off. . |
| 778174 | 3/1935 | France . |
| 403840 | 2/1923 | Germany . |
| 629178 | 4/1931 | Germany . |
| 3310721 | 11/1983 | Germany . |
| 4220651 | 12/1993 | Germany . |
| 2121467A | 4/1983 | United Kingdom . |

OTHER PUBLICATIONS

Derwent Abstract For DE 4220651, Dec. 16, 1993.
Derwent Abstract For EP 33832, Aug. 19, 1991.
Derwent Abstract For DE 3310721, Nov. 10, 1983.

*Primary Examiner*—Henry J. Recla
*Assistant Examiner*—Steven O. Douglas
*Attorney, Agent, or Firm*—Martin Connaughton

[57] ABSTRACT

A method for the multiple filling and emptying of a receptacle with pourable product having low bulk density. The method comprises the following features:

a) providing a flexible and air-permeable fabric container with at least one access port as a receptacle;

b) filling the fabric container with product by applying a negative pressure to the fabric container and sucking the product through an opened access port into the fabric container, until a predetermined filling weight is reached, and closing the access port;

c) emptying the fabric container, by connecting an access port to a discharge device and opening the access port and sucking the product into a conduit system or a reservoir until the fabric container is evacuated and has folded up; and d) closing the access port.

5 Claims, 3 Drawing Sheets

METHOD FOR THE FILLING AND EMPTYING OF A RECEPTACLE

FIELD OF INVENTION

The subject of the present invention is a method for the multiple filling and emptying of a receptacle with pourable product having low bulk density.

BACKGROUND OF INVENTION

Pourable substances having extremely low bulk density presents various problems. Both the manufacturers and the consumers are faced with the fact that such substances cause dust to swirl upwards in the presence of even the slightest air convection. The generation of dust must be avoided in order to safeguard personnel having to deal with the product against damage to their health caused by breathing in the dust. Furthermore, the low bulk density gives rise to increased transport costs, because the ratio of package weight to filling weight is high and a large amount of packaging material is required.

The problem with the packaging material can be avoided by providing a convoy of tank trucks as transport receptacles for the product. However, this means increased investment costs for necessary silo and conveyor systems for the product to the consumer. For this reason, particularly for purchasers of small quantities of the product, transport by a convoy of tank trucks is not practical.

The advantage of introducing the product into air-permeable bags and transporting the bags, is that the product is compressed when it is sucked into the bag and its filling density rises in relation to its natural bulk density. The transport costs decrease as a result of the higher proportion of product in the package weight. However, this cost saving is countered by an extra outlay for procuring the bags and costs for disposing of them. Moreover, it is current practice for the bags to be cut open for further processing of the product by the personnel of the consumer and for empty bags to be folded or rolled up. Although generation of dust occurring at the same time can be reduced by means of suction-extraction devices, the personnel is nevertheless exposed to an intensive and disagreeable air flow.

The outlay for packaging material is reduced by means of foldable reusable cardboard boxes with an inner bag, however the problem that dust swirls upwards when the emptied cardboard boxes are folded together remains. Moreover, the transport costs remain relatively high, because the product cannot be compacted when the cardboard boxes are being filled, and its proportion of the package weight is relatively small.

SUMMARY OF INVENTION

The object of the present invention was to provide a method, where the problems described above are avoided and are suitable for substantial automation.

The object of the present invention is achieved by a method for the multiple filling and emptying of a receptacle with pourable product having low bulk density, defined as:

a) providing a flexible and air-permeable fabric container with at least one access port as a receptacle;

b) filling the fabric container with product by applying negative pressure to the fabric container and sucking the product through an opened access port into the fabric container until a predetermined filling weight is reached, and closing the access port;

c) emptying the fabric container, by connecting an access port to a discharge device and opening the access port and sucking the product into a conduit system or a reservoir until the fabric container is evacuated and has folded up; and d) closing the access port.

The present invention allows the dust-free filling and emptying of the receptacle. During filling, the product is compacted in a similar way to filling in bags, without its structure thereby being destroyed. Because of the low dead weight of the fabric container, the proportion of the product in the package weight is comparatively high. During the emptying of the product, the fabric container is reduced to a fraction of its original volume, thus making the return transport of the fabric container to the product manufacturer easier. The multiple use of a fabric container lowers the costs for the procurement and disposal of the fabric containers.

The method is suitable for the packaging of pyrogenically produced silicic acid. Pyrogenically produced silicic acid has an extremely low bulk density of 20 to 150 g/l and, when transferred into the fabric container, can be compacted to a filling density of 80 to 170 g/l. It is preferred to use fabric containers with a capacity of 90 to 350 kg filling weight.

The material from which the fabric container is manufactured must be flexible and air-permeable. Preferably, a single-layer or multilayer synthetic fabric which can be reinforced at the seams is used. The fabric container must have at least one closable, preferably tubular access port for filling and emptying the product. Two access ports, one filling port and one port for emptying the fabric container, are preferred.

DESCRIPTION OF DRAWINGS

The method is explained in more detail below.

Figure 1:
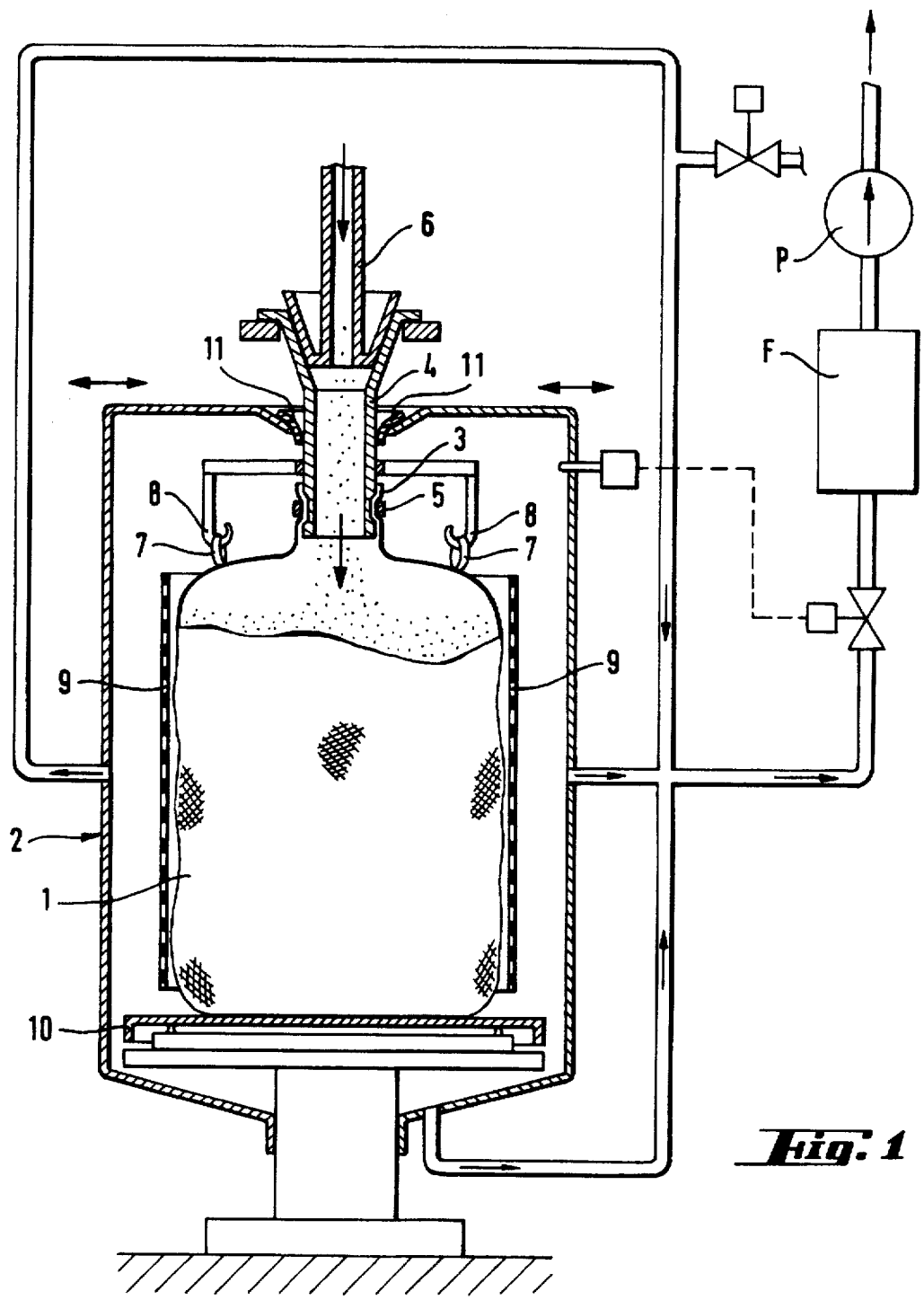
FIG. 1 shows the filling of a fabric container in a diagrammatic representation.

The fabric container 1 is located in a filling station 2 which can be in a release position or in a filling position. In the filling position, the filling station is closed, as shown in FIG. 1. In the release position, the filling station is opened so that the fabric container can be transported in or out. The change from the filling position into the release position can be made, in that the filling station, comprising two halves movable relative to one another, can be moved toward or away from one another in a pincer-like movement.

A filling connection 4 projects into the access port 3 of the fabric container 1. The interspace between the inside of the access port and the outside of the filling connection is closed in a dust-tight manner by a clamp fastener 5. The filling connection 4 is widened upwards in a funnel-shaped manner and affords space for a insertable filling attachment 6 which is connected to a reservoir for the pourable product, for example a silo. The fabric container is hooked by means of the lugs 7 into the hooks 8 of the filling connection 4 and, secured by a supporting cage 9, stands on a balance 10. When the filling station 2 is in the filling position, the transition between the filling connection 4 and the housing of the filling station is sealed off by means of sealing lips 11.

To fill the fabric container with the product, the filling attachment 6 is introduced into the filling connection 4. Subsequently, by means of a pump P protected by a filter F, the pressure in the filling station is reduced relative to the ambient pressure. As a result of the negative pressure which builds up, product is sucked out of the reservoir into the fabric container. During this operation, no dust can escape outwards. The product is compacted in the fabric container in dependence on the negative pressure prevailing in the filling station. As soon as the desired filling weight is reached, the pressure in the filling station is matched to the ambient pressure and the conduit between the filling attachment and the reservoir is closed by means of a valve. To transport away the filled fabric container, the filling attachment 6 is raised, the filling station 2 brought into the release position and the access port 3 of the fabric container closed. The operations described are preferably controlled via a computer (not represented in the drawing).

Figure 2:
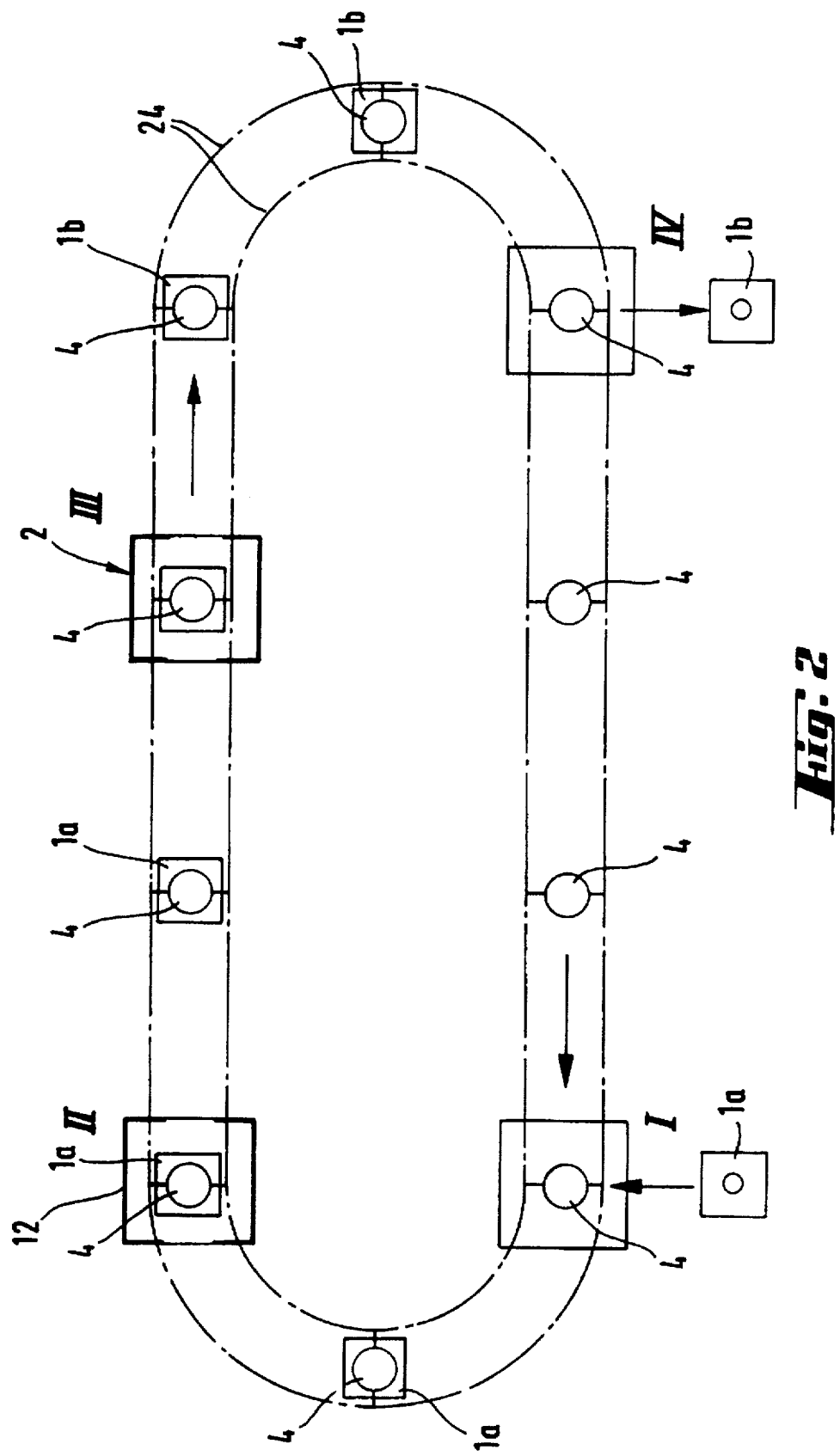
FIG. 2 represents a transport line for the automatic filling of several fabric containers.

One embodiment of the invention provides for incorporating the filling station into a transport line, preferably into an overhead trolley conveyor, on which several fabric containers are automatically supplied to it in a row for filling. An example of such a transport line is represented in FIG. 2. The figure shows a top view of an overhead trolley conveyor with a ring-like rail system 24. Several filling connections 4 are mounted on this rail system and are moved round the rail system in a clockwise direction. The filling station 2 is located in a filling zone III of the transport line. The empty fabric containers 1a are suspended on the filling connections 4 manually or mechanically in a preparation zone I. As a result of the movement of the filling connections, the fabric containers pass after some time into the filling station 2. Optionally, passage through a zone II having a cleaning station 12 can be provided beforehand, the fabric containers being cleaned and subjected to an operating test in the cleaning station 12. The filling of the product in the filling station 2 takes place in the above-described way, in that the filling attachment, not shown in FIG. 2, is introduced into the filling connection 4 and the filling station 2 is brought into the filling position.

The filled fabric containers 1b move on the rail system and finally reach a finishing zone IV, in which the access port of the fabric container is closed, and the fabric container is lifted from the filling connection and, deposited on a transport pallet in order to be transported away. The filled fabric container is expediently also provided with a bottom film and a shrink cover welded to the latter, in order to protect the fabric container against moisture. The filling connection 4 is available once again for a new filling cycle which commences with the fastening of an empty fabric container.

For emptying, an access port of the fabric container, provided for this purpose, is connected to a discharge device. A tubular emptying port, into which the discharge device can be introduced is preferred. The discharge device is connected to a suction means, preferably a double diaphragm pump. The filling product is then sucked off into a repository or into a pipeline system through the opened access port with the aid of the suction means. The discharge device is equipped with means which make it possible to ventilate the fabric container and to comminute compacted product.

Figure 3:
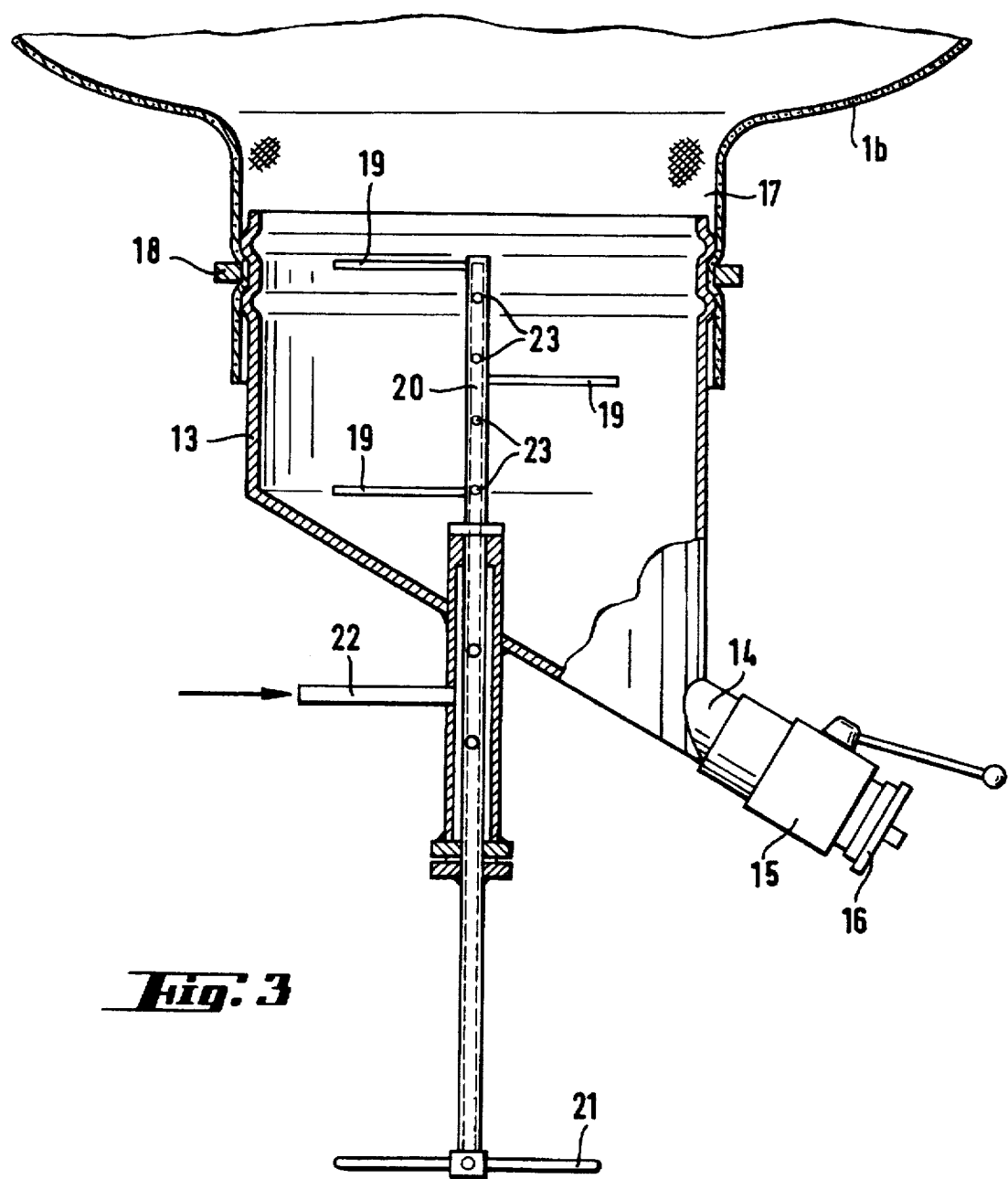
FIG. 3 shows a preferred discharge device for emptying the fabric container.

FIG. 3 represents a discharge device. It comprises a tubular attachment 13 which is narrowed downward and which opens into a connection piece 14 having a ball valve 15 and hose coupling 16. The connection piece is connected by a hose to the suction means not shown in the Figure. The tubular emptying port 17 of the filled fabric container 1b is slipped over the attachment 13 and is held on the outside by a clamping ring 18. The discharge device possesses agitating fingers 19 which are mounted on a tube linkage 20 projecting axially into the attachment 13 and which can be moved by the capstan 21. If it is necessary to ventilate the fabric container,this can be carried out by blowing compressed air into the tube linkage 20 which, for this purpose has a compressed-air connection 22 and outlet bores 23.

As a result of the suction effect of the pump, the emptied fabric container is evacuated until it folds up and for example, can be rolled up. In this compact state, after the closing of the access port and the uncoupling of the pump, the fabric container can be returned to the product manufacturer for refilling. In the above-described type of emptying, scarcely any dust which could harm the personnel involved in the emptying is swirled upwards.

What is claimed is:

1. A method for the multiple filling and emptying of a receptacle with pourable product having low bulk density, comprising a) providing a flexible and air-permeable fabric container with at least one access port as a receptacle;

b) filling the fabric container with product by applying negative pressure to the fabric container and sucking the product through a first opened access port of said at least one access port into the fabric container until a predetermined filling weight is reached, and closing the first access port;

c) emptying the fabric container, by connecting a second access port of said at least one access port to a discharge device and opening the second access port and sucking the product into a conduit system or a reservoir until the fabric container is evacuated and has folded up; and d) closing the second access port.

2. The method as claimed in claim 1, wherein the pourable product has a bulk density of 20 to 150 g/l and filling weight is 90 to 350 kg.

3. The method as claimed in claim 1 or claim 2, wherein the pourable product is pyrogenically produced silicic acid.

4. The method as claimed in claim 1, wherein the filling of the fabric container takes place at a computer controlled filling station.

5. The method as claimed in claim 4, wherein the filling station is incorporated into a transport line, on which empty fabric containers are transported forward for filling and fabric containers filled with the product are subsequently transported away.

* * * * *